US008843100B2

(12) United States Patent
Davydov et al.

(10) Patent No.: US 8,843,100 B2
(45) Date of Patent: Sep. 23, 2014

(54) COORDINATED MULTIPOINT CONFIGURATION BASED ON CHANNEL STATE INFORMATION REFERENCE SIGNALS

(75) Inventors: Alexei Davydov, Nizhny Novgorod (RU); Gregory Morozov, Nizhny Novgorod (RU); Alexander Maltsev, Nizhny Novgorod (RU); Ilya Bolotin, Nizhny Novgorod (RU); Vadim Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 13/534,313

(22) Filed: Jun. 27, 2012

(65) Prior Publication Data

US 2013/0196699 A1    Aug. 1, 2013

Related U.S. Application Data

(60) Provisional application No. 61/591,641, filed on Jan. 27, 2012.

(51) Int. Cl.
*H04M 11/00* (2006.01)

(52) U.S. Cl.
USPC .................. 455/403; 455/432.1; 455/501

(58) Field of Classification Search
USPC .............. 455/436, 439, 440, 445, 432.1, 500, 455/67.11, 403, 501
See application file for complete search history.

(56) References Cited

U.S. PATENT DOCUMENTS

| 6,275,575 | B1 * | 8/2001 | Wu ........................ 379/202.01 |
| 8,265,629 | B2 * | 9/2012 | Kwon et al. .................. 455/436 |
| 2010/0246534 | A1 * | 9/2010 | Vargantwar et al. .......... 370/332 |
| 2011/0098054 | A1 * | 4/2011 | Gorokhov et al. ......... 455/452.1 |
| 2011/0269449 | A1 | 11/2011 | Kazmi et al. |
| 2011/0269459 | A1 * | 11/2011 | Koo et al. ..................... 455/434 |
| 2012/0028665 | A1 * | 2/2012 | Kwon et al. .................. 455/501 |
| 2013/0303230 | A1 * | 11/2013 | Sayana et al. ................. 455/524 |

OTHER PUBLICATIONS

International Search Report and Written Opinion mailed May 14, 2013 from International Application No. PCT/US2013/022790.
Huawei et al., "RRM measurements on CSI-RS," R1-113644, 3GPP TSG-RAN WG1 Meeting #67, San Francisco, UDS, Nov. 14-18, 2011, See pp. 1-2.
Qualcomm Inc., "CSI-RS configuration in support of downlink CoMP," R1-114113, 3GPP TSG-RAN WG1 Meeting #67, San Francisco, USA, Nov. 14-18, 2011, See pp. 1-4; and fig. 1.
Sharp, "CSI-RS configuration for UL transmission," R1-113823, 3GPP TSG-RAN WG1 Meeting #67, San Francisco, USA, Nov. 14-18, 2011, See pp. 1-5; fig. 1; and table 1.
Samsung, "Discussions on RSRP measurements based on CSI-RS," R1-114227, 3GPP TSG-RAN WG1 Meeting #67, San Francisco, USA, 14-18 Nov. 2011, See pp. 1-3; and table 1.

* cited by examiner

*Primary Examiner* — Sonny Trinh
(74) *Attorney, Agent, or Firm* — Schwabe, Williamson & Wyatt, P.C.

(57) ABSTRACT

Embodiments of the present disclosure describe devices, methods, computer-readable media and systems configurations for configuring coordinated multipoint (CoMP) for network devices. In various embodiments, configuration of the CoMP may be based on channel state information reference signals. Other embodiments may be described and/or claimed.

30 Claims, 6 Drawing Sheets

COORDINATED MULTIPOINT CONFIGURATION BASED ON CHANNEL STATE INFORMATION REFERENCE SIGNALS

CROSS REFERENCE TO RELATED APPLICATIONS

The present application claims priority to U.S. Provisional Patent Application No. 61/591,641, filed Jan. 27, 2012, entitled "ADVANCED WIRELESS COMMUNICATION SYSTEMS AND TECHNIQUES," the entire disclosure of which is hereby incorporated by reference.

FIELD

Embodiments of the present invention relate generally to the field of communications, and more particularly, to coordinated multipoint service configuration based on channel state interference reference signals in wireless communication networks.

BACKGROUND

Coordinated multipoint (CoMP) systems have been developed in order to improve various operational parameters in wireless networks. A CoMP measurement set is a set of nodes for which channel state information feedback is provided by a user equipment (UE). Configuration of a CoMP measurement set involves evaluation of transmission parameters related to nodes of a CoMP resource management set, which includes all possible nodes available for coordinated transmissions. The nodes of the CoMP measurement set will then be selected from the CoMP resource management set based on various criteria. Proper configuration of the CoMP measurement set will reduce uplink overhead from the UE due to unnecessary CSI feedback information for nodes of marginal utility within the CoMP system.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for coordinated multipoint service configuration based on channel state interference reference signals.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

Unless the context dictates otherwise, the phrases "A or B," "A and/or B," and "A/B" all mean (A), (B), or (A and B).

As used herein, the term "circuitry" may refer to, be part of, or include an Application Specific Integrated Circuit (ASIC), a processor (shared, dedicated, or group) and/or memory (shared, dedicated, or group), combinational logic circuit, or other electronic circuit that provides the described functionality. In various embodiments, the circuitry may execute instructions stored in one or more computer-readable media to provide the described functionality.

Figure 1:
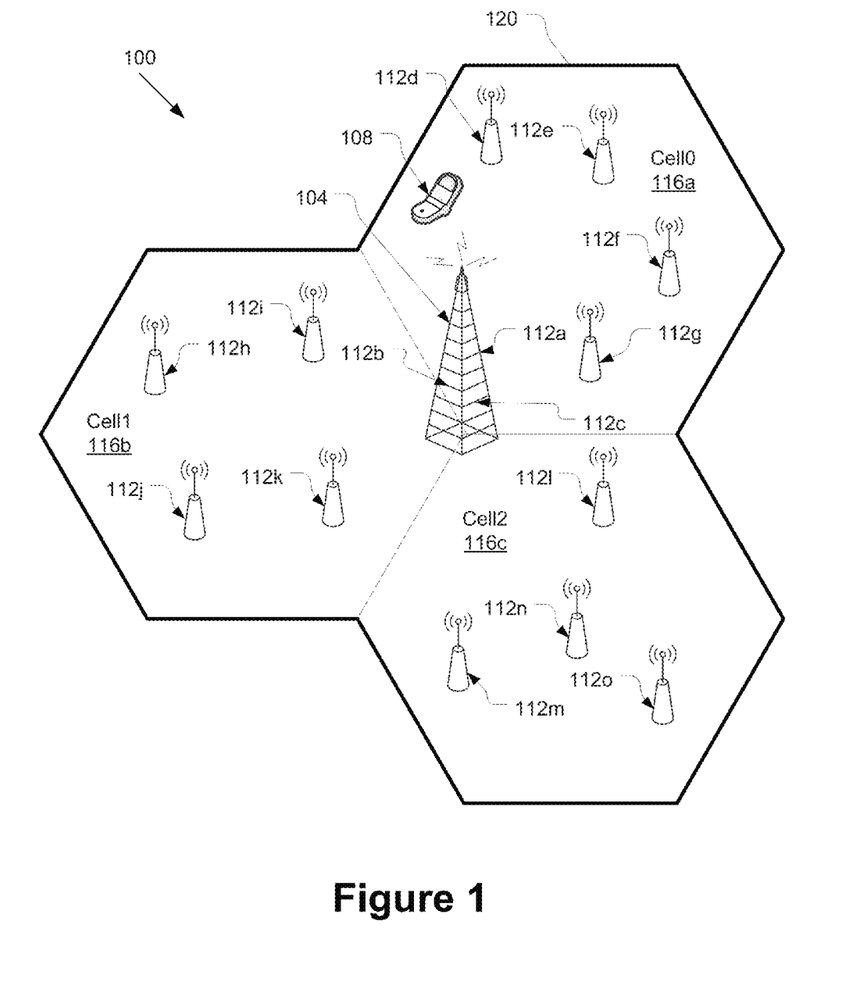
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., evolved Node B (eNB) 104, configured to wirelessly communicate with user equipment (UE) 108.

At least initially, the eNB 104 may have an established wireless connection with the UE 108 and may operate as a serving node for coordinated multi-point (CoMP) communications with the UE 108. The eNB 104 may include one or more communication points 112a-c that service individual cells 116a-c of the network 100. For example, communication point 112a may cover a first cell 116a, communication point 112b may cover a second cell 116b, and communication point 112c may cover a third cell 116c. In other embodiments, the eNB 104 may include other numbers of communication points and/or may cover other number of cells. For example, the eNB 104 may include only one communication point and/or may only cover one cell. For another example, the eNB 104 may include more than three communication points and/or or may cover more than three cells.

The network 100 may further include one or more additional communication points 112d-o. The communication points 112d-o may be remote radio heads (RRHs), also referred to as remote radio equipment (RRE), and/or base stations (e.g., eNBs). In some embodiments, the communication points 112d-o may transmit with a lower power than eNB 104. Communication points 112d-o may be located in and/or associated with cells 116a-c as shown. In some embodiments, low-power nodes may be located such that their coverage areas partially overlap with the coverage areas of the cells 116a-c, but may not be entirely included into these respective cells.

The communication points 112d-o may be configured to facilitate wireless communication with the UE 108 through coordination with the eNB 104. The communication points 112a-c along with the one or more additional communication points 112d-o may be collectively referred to as a CoMP cluster 120. The communication points 112a-o may communicate with one another over wireless connections and/or wired connections (e.g., a high-speed fiber backhaul connection).

Figure 2:
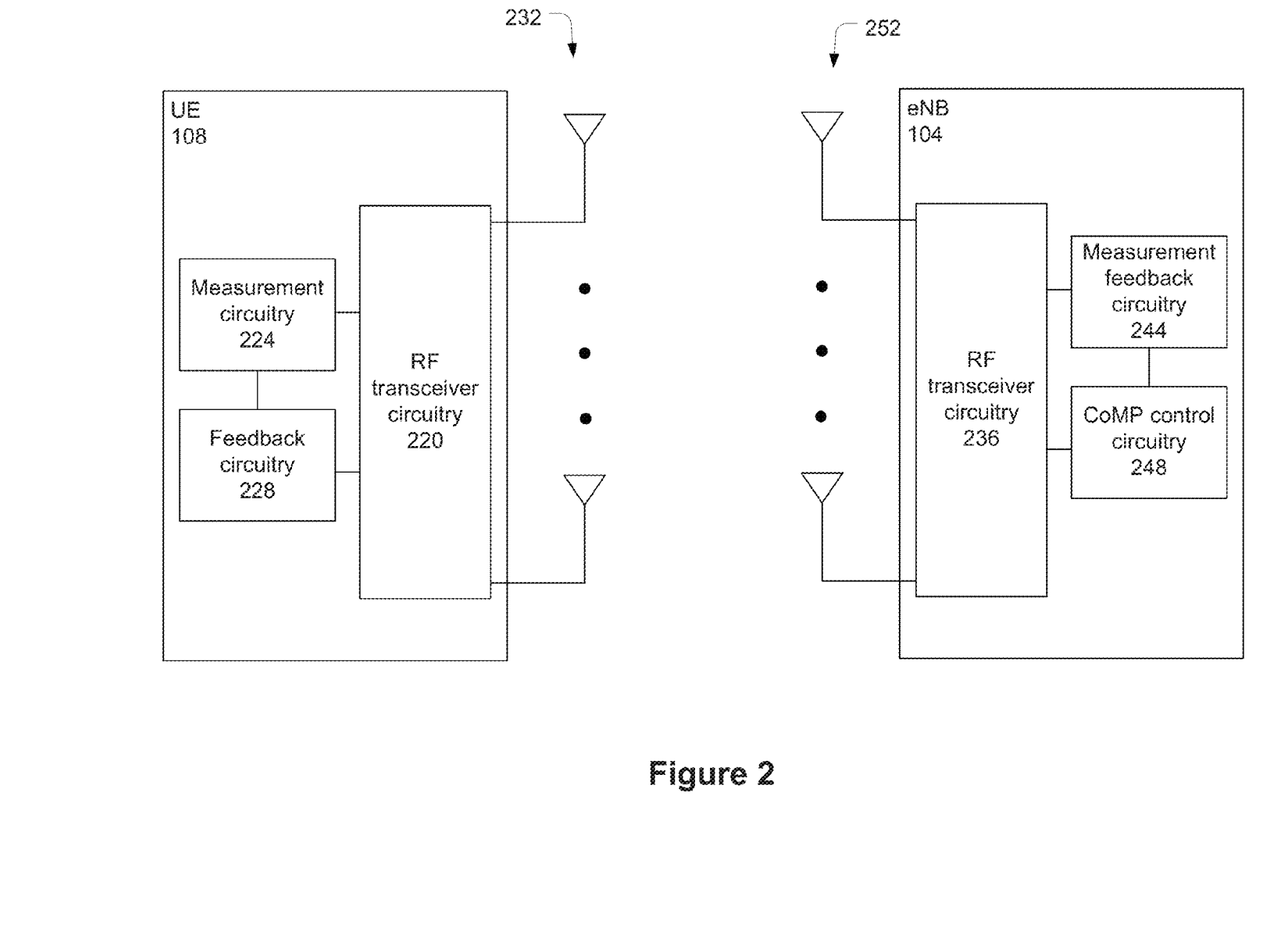
FIG. 2 schematically illustrates a user equipment and an enhanced node base station in accordance with various embodiments.

As shown in FIG. 2, the UE 108 may include radio frequency (RF) transceiver circuitry 220, measurement circuitry 224, and feedback circuitry 228 coupled with one another at least as shown. The RF transceiver circuitry 220 may be further coupled with one or more antennas 232 of the UE 108. The RF transceiver circuitry 220 may perform various RF signal processing, e.g., filtering, modulating/demodulating, encoding/decoding, amplifying, etc., to communicate (e.g., transmit/receive) RF signals, via the one or more antennas 232, over network 100.

As further shown in FIG. 2, eNB 104 may include RF transceiver circuitry 236, measurement feedback circuitry 244, and CoMP control circuitry 248 coupled with one another at least as shown. The RF transceiver circuitry 236 may be further coupled with one or more antennas 252 of the eNB 104. The RF transceiver circuitry 236 may perform various RF signal processing, e.g., filtering, modulating/demodulating, encoding/decoding, amplifying, etc., to communicate (e.g., transmit/receive) RF signals, via the one or more antennas 252, over network 100.

One or more of the antennas 252 may be associated with individual communication points 112a-c (e.g., dedicated for communications within an individual cell 116a-c). Alternatively, or additionally, one or more of the antennas 252 may alternate between communicating in one or more cells 116a-c.

In some embodiments, one or more of communication points 112d-o may have similar modules/components as eNB 104.

The CoMP control circuitry 248 may communicate with the communication points 112a-o in order to manage/coordinate CoMP service for UEs within the boundaries of the CoMP cluster 120. The communication points 112a-o may comprise a CoMP resource management set (CRMS), which includes all of the communication points that can potentially cooperate to serve a particular UE, e.g., UE 108. In some embodiments, only communication points of a particular cell may be considered a CRMS.

A CoMP measurement set (CMS) may be selected from the CRMS, e.g., by the CoMP control circuitry 248 of the eNB 104. The CMS may include communication points for which the UE 108 may provide channel state information (CSI) feedback.

Configuration of a CoMP measurement set may be based on measurements of path gains between a UE and each communication point in the CRMS. The communication points associated with the strongest path gains may then be selected for CMS. Measurement of the path gains may be performed by the UE measuring CSI reference signal (RS) resources to determine transmission parameters of CSI-RSs transmitted by the communication points. Path gains may alternatively be measured by the communication points using reference signals transmitted by the UE.

While path gain measurements may provide some useful information for configuring CMS they do not contain information on the location of the UE 108 with respect to a boundary of the CoMP cluster 120. Thus, interference generated by communication points outside of the CoMP cluster 120 is not taken into account in the path gain measurements. Configuration of a CMS based on such measurements may result in ineffective or undesirable CoMP service.

Embodiments described herein include the measurement circuitry 224 determining a boundary metric based on measurements of CSI-RSs. The boundary metric may indicate a proximity of the UE 108 to the boundary of the CoMP cluster 120. The feedback circuitry 228 may feed the boundary metric back to the measurement feedback circuitry 244. The CoMP control circuitry 248 may then determine a CoMP service configuration for the UE 108. Determination of the CoMP service configuration may include enabling/disabling CoMP service for the UE 108, enabling/disabling inter-CoMP cluster coordination, selection of communication points to include in the CMS, etc.

While the described embodiments discuss the measurement circuitry 224 that determines the boundary metric as being on the UE 108, other embodiments may include measurement circuitry on one or more of the communication points determining the boundary metric based on measurements of CSI-RSs transmitted by the UE.

In some embodiments, the boundary metric may be a reference signal received quality (RSRQ) value. Contrary to an RSRQ value that may be used in handover scenarios, which is measured on a wideband common reference signal (CRS), the boundary RSRQ value described herein may be measured on a narrowband CSI-RS. Specifically, the boundary RSRQ value may be defined as a ratio of a reference signal received power (RSRP) value to a received strength signal indicator (RSSI) value. The RSRP value may be a measurement of the power from a CSI-RS in which a channel estimation scheme is used to estimate and remove noise of the CSI-RS resource channel. The RSSI value may be a measure of the entire power, including the CSI-RS and the noise.

In other embodiments, other CSI-RS-based boundary metrics may be used in conjunction with, or in place of, the RSRQ value. For example, in some embodiments, a signal to interference plus noise ratio (SINR) value may be the boundary metric. A SINR value, as described herein, may be a ratio of the RSRP value, as described above, to a noise value that corresponds to noise generated from communication points external to the CoMP cluster 120. In some embodiments, the noise generated external to the CoMP cluster 120 may be measured on a muted CSI-RS resource as explained below with reference to FIG. 3.

Figure 3:
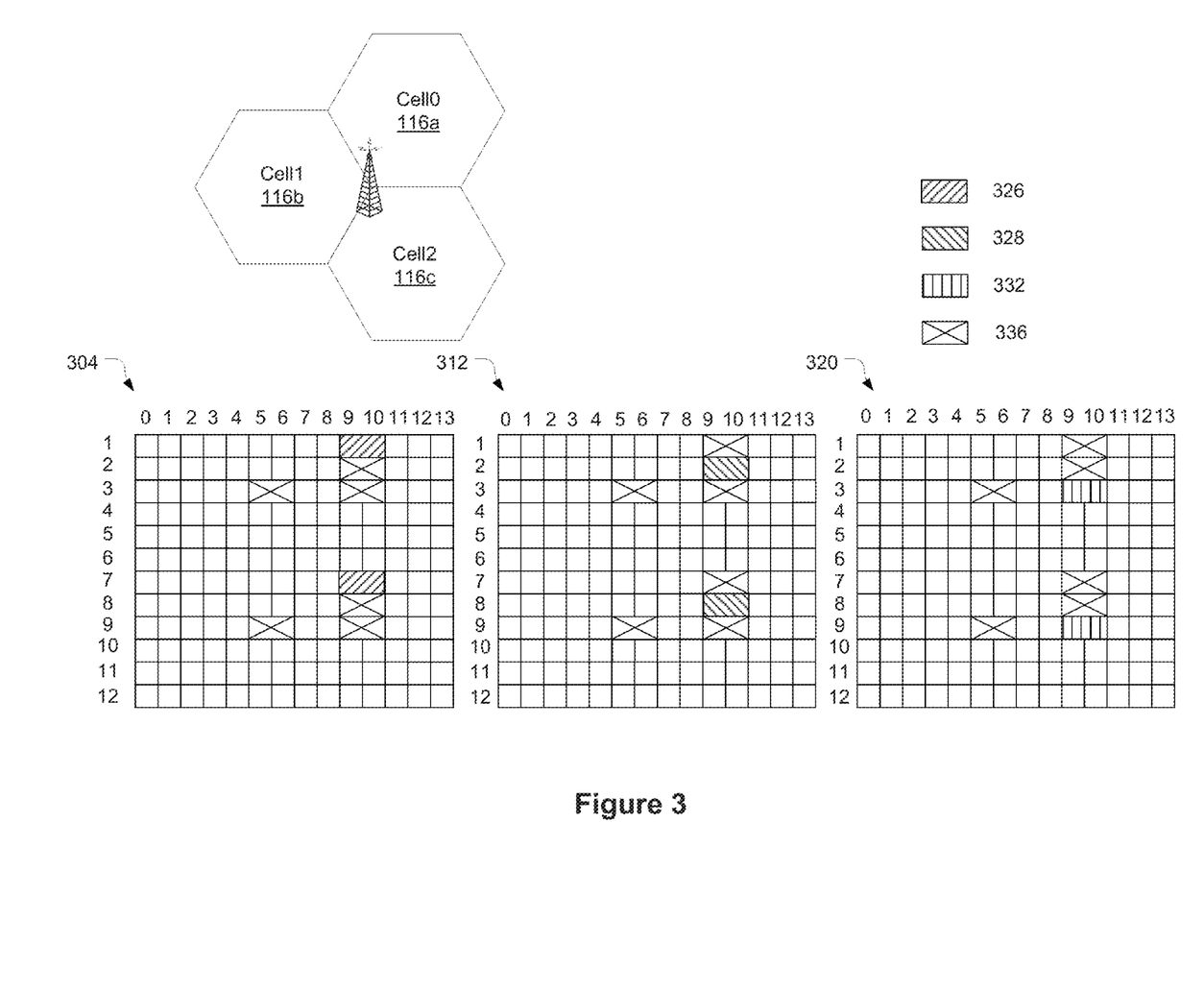
FIG. 3 schematically illustrates physical resource blocks in accordance with various embodiments.

FIG. 3 schematically illustrates physical resource block (PRBs) pairs of different communication points in accordance with various embodiments. In particular, PRB pair 304 corresponds with a first communication point, PRB pair 312 corresponds with a second communication point, and PRB pair 320 corresponds with a third communication point, although the scope of the invention is not limited in this respect and in other embodiments more or less PRB pairs may be used by more or less communication points respectively. The PRB pairs are shown with orthogonal frequency division multiplex (OFDM) symbols numbered (0-13) across the top, and subcarriers numbered (1-12) down the side. Each PRB pair may include a first PRB corresponding to the first seven OFDM symbols and a second PRB corresponding to the last seven OFDM symbols. A single OFDM symbol and subcarrier may be referred to as a resource element.

A PRB pair may include one or more CSI-RSs transmitted by respective communication points of a cell that may be used, by the UEs, to determine the boundary metric in addition to other information, e.g., other channel state information. For example, PRB pair 304 may include CSI-RSs 326 disposed in the ninth and tenth OFDM symbols of the first and seventh subcarriers; PRB pair 312 may include CSI-RSs 328 disposed in the ninth and tenth OFDM symbols of the second and eighth subcarriers; and PRB pair 320 may include CSI-RSs 332 disposed in the ninth and tenth OFDM symbols of the third and ninth subcarriers.

In some embodiments, CSI-RSs 326 may be transmitted by the first communication point; CSI-RSs 330 may be transmitted by the second communication point; and CSI-RSs 334 may be transmitted by the third communication point. In some embodiments the first communication point, the second communication point and the third communication point may be located in one cell such as the cell0 116a. For example, the first communication point may correspond to communication point 112a, the second communication point may correspond to communication point 112d, and the third communication point may correspond to communication point 112e.

The PRB pairs may have physical downlink shared channel (PDSCH) muted resources 336 that correspond to the CSI-RSs transmitted by other communication points. For example, PRB pair 304 may have PDSCH muted resources 336 on ninth and tenth OFDM symbols of second, third, eighth, and ninth subcarriers; PRB pair 312 may have PDSCH muted resources 336 on ninth and tenth OFDM symbols of first, third, seventh, and ninth subcarriers; etc.

The PRB pairs may further include PDSCH muted resources 336 at other resources to allow the UE, e.g., UE 108, to measure noise generated external to the CoMP cluster 120. For example, each PRB pair may include PDSCH muted resources 336 on fifth and sixth OFDM symbols of third and ninth subcarriers. This may allow the UE 108 to measure the noise generated outside of the CoMP cluster 120, which may be used to determine the SINR value as described above.

Figure 4:
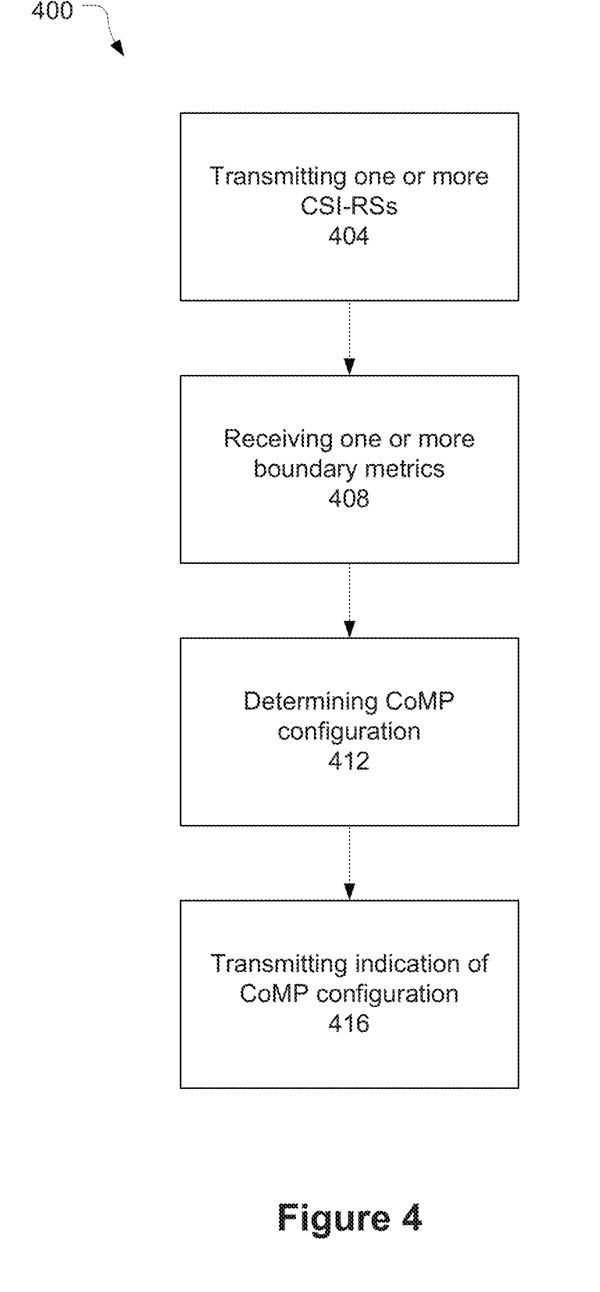
FIG. 4 is a flowchart illustrating a method of operation in accordance with various embodiments.

FIG. 4 illustrates a method 400 of managing CoMP communications with a UE (e.g., UE 108) in accordance with various embodiments. Method 400 may be performed by an eNB, such as eNB 104. In some embodiments, the eNB may include and/or have access to one or more computer-readable media having instructions stored thereon, that, when executed, cause the eNB to perform the method 400.

At 404, the method 400 may include transmitting one or more CSI-RSs to a UE. The CSI-RSs may be transmitted by the eNB and/or one or more other communication points of the CMS. The CSI-RSs may serve as a basis for measurements, by the UE, to determine a boundary metric. In some embodiments, the measurements may be long term measurements of CSI-RSs transmitted over a plurality of PRB pairs. Long-term measurements, as used herein, may be measurements measured over several (e.g., 20) RF frames. RSRQ, RSSI, and RSRP may be based on long-term measurements.

In some embodiments, prior to transmitting the CSI-RSs at 404, the eNB may provide various configuration parameters to the UE to identify the CSI-RS resources and/or communication points of the CMS. In various embodiments, these configuration parameters may be provided as part of a radio resource control (RRC) configuration or an earlier instantiation of method 400.

At 408, the method 400 may include receiving one or more boundary metrics from the UE. In some embodiments, the boundary metrics may be received by measurement feedback circuitry of the eNB, e.g., the measurement feedback circuitry 244. As discussed above, a boundary metric may be an RSRQ and/or SINR value and may indicate a proximity of the UE to a boundary of the CoMP cluster.

In some embodiments, individual boundary metrics corresponding to individual communication points of the CMS may be provided to the measurement feedback circuitry. In some embodiments, a UE may feedback a composite boundary metric that is based on a plurality of individual boundary metrics measured by the UE. The composite boundary metric may be an aggregation, average, or some other measurement of the plurality of individual boundary metrics At 412, the method 400 may include determining a CoMP service configuration. In some embodiments, the CoMP service configuration may be determined by CoMP control circuitry of the eNB, e.g., CoMP control circuitry 248. The CoMP control circuitry may compare each of the reported boundary metrics to a predetermined threshold and make CoMP service configuration determinations based on the comparison. For example, the CoMP control circuitry may receive RSRQ values that correspond to the communication points in a CMS. These RSRQ values may be compared to a predetermined RSRQ threshold, for example, approximately −6 decibels (dB). If all (or some other predetermined portion) of the RSRQ values are lower than the predetermined RSRQ threshold, it may be determined that the UE is likely to be located at or near the boundary of the CoMP cluster. Therefore, CoMP service may be disabled for the UE (or alternatively, inter-CoMP-cluster coordination may be enabled if available).

In an embodiment in which the CoMP control circuitry receives, as the boundary metrics, SINR values that correspond to the communication points in the CMS, the SINR values may be compared to a predetermined SINR threshold, for example, between approximately 0--3 dB. In a manner similar to above, if it is determined that all (or some other predetermined portion) of the SINR values are lower than the predetermined SINR threshold, it may be determined that the UE is likely to be located at or near the boundary of the CoMP cluster. Therefore, CoMP service may be disabled for the UE (or alternatively, inter-CoMP-cluster coordination may be enabled if available).

In the event that it is determined that CoMP service is enabled for the UE, the CoMP control circuitry may further determine which of the communication points of the CRMS are to be included in the CMS. This determination may be based on the boundary metrics and/or other feedback from the UE and/or other communication points. In some embodiments, the selection of the communication points for inclusion in the CMS may be particular for a UE. That is, each UE may be associated with its own CMS. In some embodiments, it may be determined that a boundary UE should have a reduced CMS (i.e., less communication nodes should coordinate their transmissions), compared with a more centrally located UE, or vice versa.

At 416, the method 400 may include transmitting an indication of the CoMP service configuration to the UE. The indication may indicate whether CoMP service or inter-CoMP-cluster coordination is enabled or disabled. If CoMP service is enabled, the indication may further indicate which communication points are included in the CMS and/or which CSI-RS resources to monitor. The communication points of the CMS may be the same as or different from the communication points for which the boundary metrics were reported.

Figure 5:
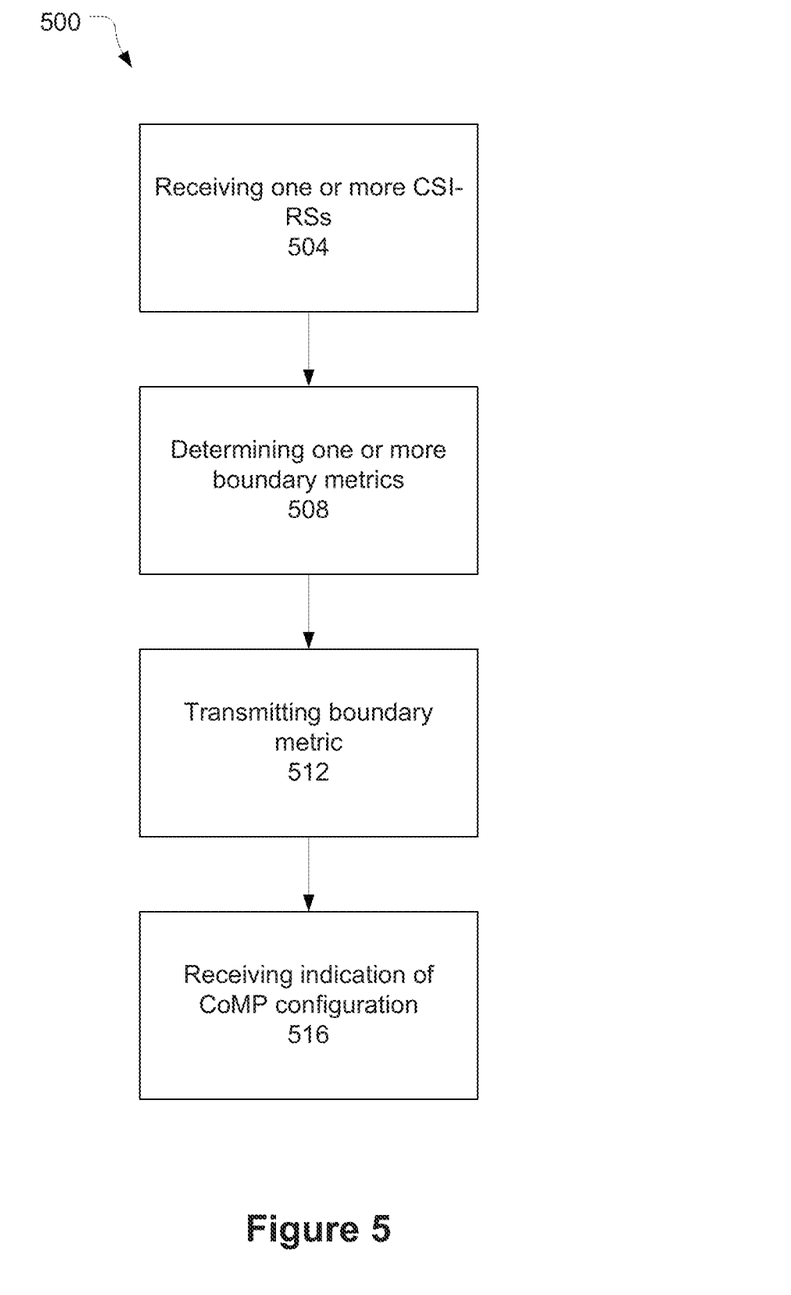
FIG. 5 is a flowchart illustrating another method of operation in accordance with various embodiments.

FIG. 5 illustrates a method 500 that may be performed by a UE (e.g., UE 108) to assist the eNB, e.g., eNB 104, in managing CoMP communications with the UE. In some embodiments, the UE may include and/or have access to one or more computer-readable media having instructions stored thereon, that, when executed, cause the UE to perform the method 500.

At 504, the method 500 may include receiving one or more CSI-RSs. The CSI-RSs may be received from the eNB in which the CoMP control circuitry is located and/or in one or more other communication points.

In some embodiments, prior to receiving the CSI-RSs at 504, the UE may receive various configuration parameters from the eNB that identify the CSI-RS resources and/or communication points of the CMS. In various embodiments, these configuration parameters may be provided as part of an RRC configuration or an earlier instantiation of method 500.

At 508, the method 500 may include determining one or more boundary metrics. The boundary metrics may be determined based on measurements of the one or more CSI-RSs received at 504. The measurements may be performed by measurement circuitry of the UE, e.g., measurement circuitry 224. The boundary metrics may be RSRQ and/or SINR values and may be based on one or more CSI-RSs from one or more communication points as described above.

At 512, the method 500 may include transmitting one or more boundary metrics. The transmitting of the boundary metrics may be performed by the feedback circuitry of the UE, e.g., feedback circuitry 228. In various embodiments, the transmitting may be performed as part of a periodical report or an event-based report.

An event-based report may be triggered upon the feedback circuitry detecting an occurrence of an event such as the boundary metric being higher than a predetermined value, or the boundary metric being within a predetermined range from a reference boundary metric (e.g., a boundary metric having the highest quality). These events may indicate or at least suggest that the UE is moving toward a CoMP cluster boundary.

At 516, the method 500 may include receiving an indication of a CoMP service configuration. The indication may be received from CoMP control circuitry and may indicate whether CoMP service or inter-CoMP-cluster coordination is enabled or disabled. If CoMP service is enabled, the indication may further indicate which communication points are included in the CMS and/or which CSI-RS resources to monitor.

In various embodiments, the signaling of the methods 400 and/or 500 may be conducted through the communication of RF signals via RF transceiver circuitry 220 and RF transceiver circuitry 236. The signaling may be medium access control (MAC) layer and/or RRC layer signaling.

Figure 6:
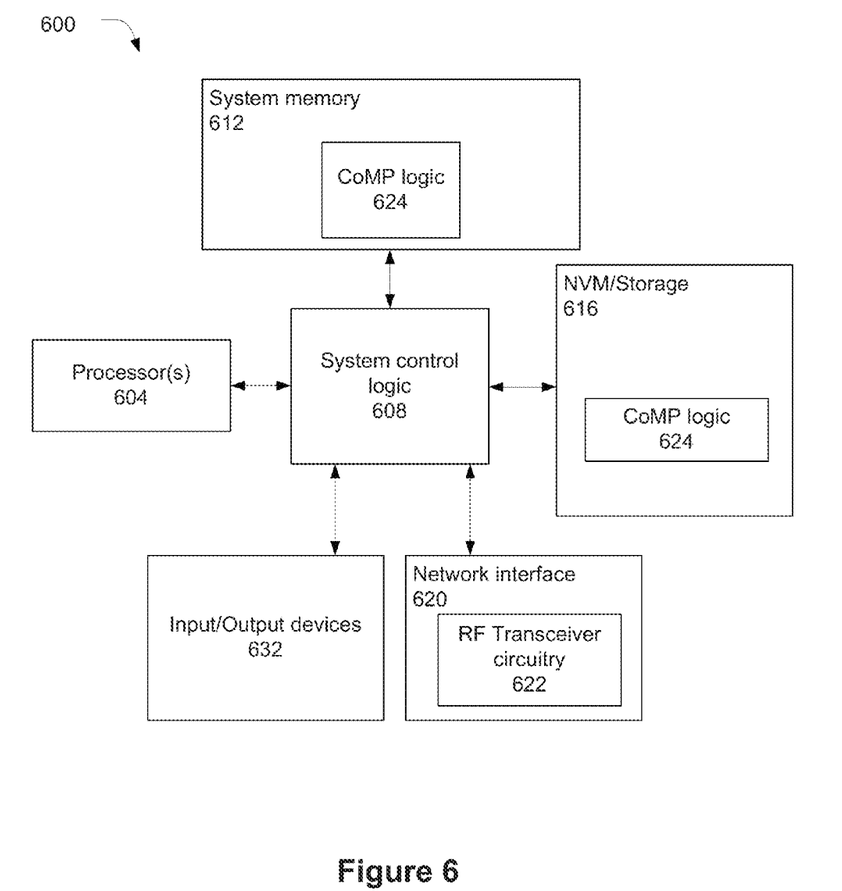
FIG. 6 schematically depicts an example system in accordance with various embodiments.

The eNB 104 and UE 108 described herein may be implemented into a system using any suitable hardware and/or software to configure as desired. FIG. 6 illustrates, for one embodiment, an example system 600 comprising one or more processor(s) 604, system control logic 608 coupled with at least one of the processor(s) 604, system memory 612 coupled with system control logic 608, non-volatile memory (NVM)/storage 616 coupled with system control logic 608, and a network interface 620 coupled with system control logic 608.

The processor(s) 604 may include one or more single-core or multi-core processors. The processor(s) 604 may include any combination of general-purpose processors and dedicated processors (e.g., graphics processors, application processors, network processors, baseband processors, digital signal processors, etc.).

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

NVM/storage 616 may include one or more tangible, non-transitory computer-readable media used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the network interface 620.

System memory 612 and NVM/storage 616 may respectively include, in particular, temporal and persistent copies of CoMP logic 624. The CoMP logic 624 may include instructions that when executed by at least one of the processor(s) 604 result in the system 600 performing operations of the devices, e.g., eNB 104 or UE 108, described herein. For example, the instructions, when executed, may result in the system 600 performing the method 400 or method 500. In some embodiments, the CoMP logic 624, or hardware, firmware, and/or software components thereof, may additionally/alternatively be located in the system control logic 608, the network interface 620, and/or the processor(s) 604.

Network interface 620 may have a transceiver 622 to provide a radio interface for system 600 to communicate over one or more network(s) and/or with any other suitable device. The transceiver 622 may be similar to, and substantially interchangeable with, RF transceiver circuitry 220 or 236. In various embodiments, the transceiver 622 may be integrated with other components of system 600. For example, the transceiver 622 may include a processor of the processor(s) 604, memory of the system memory 612, and NVM/Storage of NVM/Storage 616. Network interface 620 may include any suitable hardware and/or firmware. Network interface 620 may include a plurality of antennas to provide a multiple input, multiple output radio interface. Network interface 620 for one embodiment may include, for example, a network adapter, a wireless network adapter, a telephone modem, and/or a wireless modem.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

The system 600 may further include input/output (I/O) devices 632. The I/O devices 632 may include user interfaces designed to enable user interaction with the system 600, peripheral component interfaces designed to enable peripheral component interaction with the system 600, and/or sensors designed to determine environmental conditions and/or location information related to the system 600.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 620 to communicate with components of a positioning network, e.g., a global positioning system (GPS) satellite.

In various embodiments, the system 600 may be a mobile computing device such as, but not limited to, a laptop computing device, a tablet computing device, a netbook, a smartphone, etc. In various embodiments, system 600 may have more or less components, and/or different architectures.

Various examples of the embodiments described herein include the following.

In some embodiments, an apparatus is described that includes measurement feedback circuitry and CoMP control circuitry. The measurement feedback circuitry may be configured to receive a boundary metric from a UE, wherein the boundary metric is based on UE measurements of one or more CSI-RSs and indicates a proximity of the UE to a boundary of a CoMP cluster. The CoMP control circuitry may be configured to determine a CoMP service configuration for the UE based on the boundary metric.

In some embodiments, the CoMP control circuitry may be configured to determine the CoMP service configuration for the UE by being further configured to select, from a plurality of nodes of a CoMP management set, at least one node to be included in a CoMP measurement set. The CoMP control circuitry may transmit an indication of the CoMP measurement set to the UE.

In some embodiments, the CoMP control circuitry may select individual CoMP measurement sets for individual UEs communicatively associated with the apparatus.

In some embodiments, the boundary metric may comprise an RSRQ value, which may be a ratio of an RSRP value to an RSSI value. The RSRP value and the RSSI value may be CSI-RS-based metrics and may be based on long-term measurements.

In some embodiments, the boundary metric may be an SINR value. The SINR value may be a ratio of an RSRP value to a noise value that corresponds to noise generated from communication points external to the CoMP cluster. The RSRP value may be based on the one or more CSI-RSs.

In some embodiments, the CoMP control circuitry may be configured to compare the boundary metric to a predetermined threshold and either enable or disable CoMP service for the UE based on comparison of the boundary metric to the predetermined threshold.

In some embodiments, the CoMP control circuitry may be configured to compare the boundary metric to a predetermined threshold and either enable or disable inter-CoMP-cluster coordination based on comparison of the boundary metric to the predetermined threshold.

Various disclosed embodiments further include a method for use in CoMP service configuration. The method may include receiving one or more one or more CSI-RSs; determining, based on at least one of the one or more CSI-RSs, a boundary metric to indicate a proximity of an apparatus to a boundary of a CoMP cluster; and transmitting the boundary metric to a CoMP control circuitry. The method may include determining the boundary metric as an RSRQ value, which may include determining an RSRP value and an RSSI value based on the one or more CSI-RSs and determining the RSRQ value as a ratio of the RSRP value to the RSSI value.

In some embodiments, determining the boundary metric may include determining an SINR value by determining an RSRP value based on the one or more CSI-RSs; determining a noise value corresponding to noise generated from communication points external to the CoMP cluster; and determining the SINR value as a ratio of the RSRP value to the noise value. Determining the noise value may include measuring noise on one or more muted resource elements of a physical downlink shared channel.

In some embodiments the method may include receiving CSI-RSs from individual communication points of a CoMP measurement set, and determining individual boundary metrics that correspond to the CSI-RSs received from the individual communication points. The reported boundary metric may be determined based on the individual boundary metrics. In some embodiments, the individual boundary metrics themselves may be reported to the CoMP control circuitry.

In some embodiments, the method may include detecting an occurrence of an event; and transmitting the boundary metric based on said detection of the occurrence. The event may be that the boundary metric is greater than a predetermined value or the boundary metric is within a predetermined range from a reference boundary metric.

Various embodiments include an article of manufacture comprising instructions stored in one or more storage media, wherein the instructions, when executed, cause a user equipment to perform operations of the UE, eNB, or components thereof.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

The invention claimed is:

1. An apparatus comprising:
measurement feedback circuitry to receive a boundary metric from a user equipment (UE), wherein the boundary metric is based on UE measurements of a reference signal received power (RSRP) value in one or more channel state information-reference signals (CSI-RSs) and indicates a proximity of the UE to a boundary of a coordinated multipoint (CoMP) cluster; and
CoMP control circuitry to determine a CoMP configuration for the UE based on the boundary metric.

2. The apparatus of claim 1, wherein the CoMP control circuitry is to determine the CoMP configuration for the UE by being further to:
select, from a plurality of nodes of a CoMP management set, at least one node to be included in a CoMP measurement set.

3. The apparatus of claim 2, wherein the CoMP control circuitry is further to transmit an indication of the CoMP measurement set to the UE.

4. The apparatus of claim 1, wherein the CoMP control circuitry is further to select individual CoMP measurement sets for individual UEs communicatively associated with the apparatus.

5. The apparatus of claim 1, wherein the boundary metric comprises a reference signal received quality (RSRQ) value.

6. The apparatus of claim 5, wherein the RSRQ is a ratio of a reference signal received power (RSRP) value to a receive strength signal indicator (RSSI) value.

7. The apparatus of claim 6, wherein the RSRP value and the RSSI value are CSI-RS-based metrics.

8. The apparatus of claim 6, wherein the RSRP value and the RSSI value are based on long-term measurements.

9. The apparatus of claim 1, wherein the boundary metric comprises a signal to interference plus noise ratio (SINR) value.

10. The apparatus of claim 9, wherein the SINR value is a ratio of the RSRP value to a noise value that corresponds to noise generated from communication points external to the CoMP cluster.

11. The apparatus of claim 1, wherein the CoMP control circuitry is to: compare the boundary metric to a predetermined threshold; and
either enable or disable CoMP service for the UE based on comparison of the boundary metric to the predetermined threshold.

12. The apparatus of claim 1, wherein the CoMP control circuitry is to: compare the boundary metric to a predetermined threshold; and
either enable or disable inter-CoMP-cluster coordination based on comparison of the boundary metric to the predetermined threshold.

13. The apparatus of claim 12, wherein the CoMP control circuitry is disposed in an enhanced node base station.

14. The apparatus of claim 12, wherein the apparatus comprises a user equipment that further comprises:
a touchscreen user interface.

15. An apparatus comprising:
measurement circuitry to:
receive one or more one or more channel state information-reference signals (CSI-RSs);
measure a reference signal received power (RSRP) value in at least one of the one or more CSI-RSs; and
determine, based on the RSRP value measured in the at least one of the one or more CSI-RSs, a boundary metric to indicate a proximity of an apparatus to a boundary of a coordinated multipoint (CoMP) cluster; and
feedback circuitry coupled with the measurement circuitry to transmit the boundary metric to a CoMP control circuitry.

16. The apparatus of claim 15, wherein the measurement circuitry is further to:
determine the boundary metric as a reference signal received quality (RSRQ) value.

17. The apparatus of claim 16, wherein the measurement circuitry is further to:
determine a receive strength signal indicator (RSSI) value based on the one or more CSI-RSs; and
determine the RSRQ value as a ratio of the RSRP value to the RSSI value.

18. The apparatus of claim 15, wherein the measurement circuitry is to:
determine the boundary metric as a signal to interference plus noise ratio (SINR) value.

19. The apparatus of claim 18, wherein the measurement circuitry is to:
determine a noise value corresponding to noise generated from communication points external to the CoMP cluster; and
determine the SINR value as a ratio of the RSRP value to the noise value.

20. The apparatus of claim 19, wherein the measurement circuitry is to determine the noise value by being to:
measure noise on one or more muted resource elements of a physical downlink shared channel.

21. The apparatus of claim 15, wherein the measurement circuitry is to:
receive CSI-RSs from individual communication points of a CoMP measurement set: and
determine individual boundary metrics that correspond to the CSI-RSs received from the individual communication points.

22. The apparatus of claim 21, wherein the measurement circuitry is further to:
determine the boundary metric based on the individual boundary metrics.

23. The apparatus of claim 21, wherein the boundary metric is one of the individual boundary metrics and the feedback circuitry is further to:
transmit the individual boundary metrics to the CoMP control circuitry.

24. The apparatus of claim 15, wherein the feedback circuitry is further to:
detect an occurrence of an event; and
transmit the boundary metric based on said detection of the occurrence.

25. The apparatus of claim 24, wherein the event includes the boundary metric being greater than a predetermined value.

26. The apparatus of claim 24, wherein the event includes the boundary metric being within a predetermined range from a reference boundary metric.

27. A non-transitory computing device-readable medium comprising instructions stored thereon that in response to execution of the instructions on a user equipment cause the user equipment to:
receive one or more one or more channel state information-reference signals (CSI-RSs);
determine, based on at least one of the one or more CSI-RSs, a boundary metric corresponding to the user equipment;
detect an occurrence of an event; and
transmit the boundary metric to an enhanced node base station based on detection of the occurrence.

28. The non-transitory computing device-readable medium of claim 27, wherein the instructions, in response to execution, further cause the user equipment to:
determine the boundary metric as a reference signal received quality (RSRQ) value.

29. The non-transitory computing device-readable medium of claim 28, wherein the instructions, in response to execution, further cause the user equipment to:
determine a reference signal received power (RSRP) value and a receive strength signal indicator (RSSI) value based on the one or more CSI-RSs; and
determine the RSRQ value as a ratio of the RSRP value to the RSSI value.

30. The non-transitory computing device-readable medium of claim 27, wherein the instructions, in response to execution, further cause the user equipment to:
determine a RSRP value based on the one or more CSI-RSs;

determine a noise value corresponding to noise generated from communication points external to the CoMP cluster; and determine SINR value as a ratio of the RSRP value to the noise value.

* * * * *